United States Patent Office 3,007,655
Patented Nov. 7, 1961

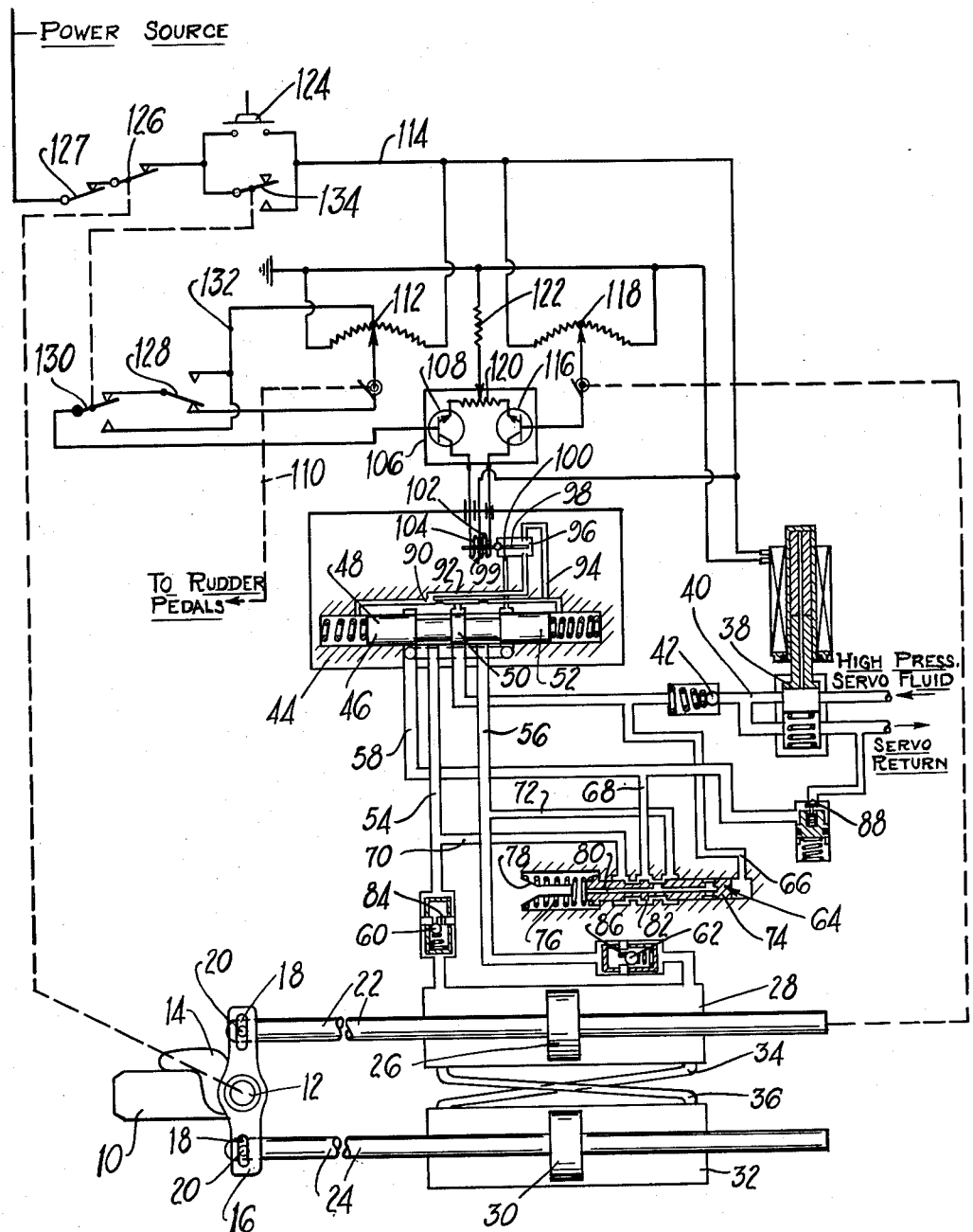

3,007,655
ELECTRICAL ACTUATOR FOR POWER STEERING UNIT
Daryl L. Criswell and Harold M. Horn, South Bend, Ind., assignors to The Bendix Corporation, a corporation of Delaware
Filed Jan. 2, 1958, Ser. No. 706,635
8 Claims. (Cl. 244—50)

This invention pertains to power steering systems and more particularly to a power steering unit in which a hydro-mechanical power steering system is controlled through the action of an electrical actuator including a transistor powered amplifier.

Hydraulically actuated and controlled power steering devices for large aircraft have been in use for a number of years, but until recently it has not been considered essential that smaller aircraft, such as fighter aircraft, be provided with power steering means. Such aircraft, at least where equipped with tricycle landing gear, have normally been provided with a casterable nose wheel which provided acceptable steering in combination with the individual brakes on the two rear wheels. This system was normally satisfactory for propeller driven aircraft where a substantial level of power is available for taxiing. With airplanes powered by a turbo jet engine, however, the low level of power output of the engines at the normal ground speed and the level of fuel consumption under such operating conditions makes it extremely desirable to avoid using the brakes for steering. For this reason it has been felt necessary to supply such aircraft with steerable nose wheels. It was at first attempted to make use of a conventional nose wheel steering device in conjunction with mechanical linkages to the pilot's cockpit, more particularly, to the rudder pedals and feedback linkages between the steered portion of the strut and the hydraulic control system. For some applications it has been determined that this arrangement is unsatisfactory because the requirement for retractible landing gear makes it necessary to permit a certain amount of lost motion in these cables or linkages. This lost motion results in undesirable hysteresis or steering error and also reduces sensitivity. It is, therefore, an object of the present invention to provide a control system for a hydro-mechanical power steering device having higher sensitivity of control than available by previous mechanical methods.

It is another object of the present invention to provide a control system in which the sensitivity can be easily varied over the steering range to suit the requirements of any individual vehicle.

It is another object to provide a power steering system and control means therefor in which inaccuracies in control due to the necessity for lengthy cables and linkages are eliminated or minimized.

It is another object to provide a power steering system and electrical control means therefor in which any failure of the electrical power supply will result in the steered wheel being controlled through its inherent castering action.

It is a further object to provide a power steering system having electrical control means which are very simple and durable.

It is a further object to provide a power steering system having electrical control means which are extremely light weight and which require very little space.

Other objects and advantages will become apparent from the following specification taken in connection with the accompanying drawing, in which the single figure shows a casterable and steerable wheel in combination with suitable operated hydraulic motor means for controlling the steered position of said wheel and electrical actuating means for said hydraulically actuated power steering means.

Referring now to the drawing a steerable wheel is shown at numeral 10 which is attached to a rotatable shaft 12 by means of an offset strut 14. Fastened to shaft 12 is a link 16 having slots 18 at either end for receiving a pair of pins 20 which are attached to a pair of axially movable shafts 22 and 24. Shafts 22 and 24 form part of a hydraulic motor system including a piston 26 drivably attached to shaft 22 and positioned within a cylinder 28 and a piston 30 drivably connected to shaft 24 and positioned within a cylinder 32. A conduit 34 provides communication between the right side of piston 26 and the left side of piston 30 and a conduit 36 provides communication between the left side of piston 26 and the right of piston 30. It will therefore be understood that whenever high pressure servo fluid is supplied to one side of one piston it is also supplied to the opposite side of the other piston and that this will result in translation of said pistons in opposite directions and a consequent rotation of link 16, shaft 12 and wheel 10. A similar but considerably more elaborate hydraulic arrangement for controlling the motion of a steered wheel is shown in Patent No. 2,580,064 issued to F. C. Albright (common assignee).

High pressure servo fluid is supplied to the hydraulic motors from a source (not shown) through a solenoid actuated valve 38, a conduit 40, and a check valve 42 in said conduit to a control valve shown generally at 44 containing an axially movable valve member 46 having lands 48, 50 and 52. A pair of conduits 54 and 56 provide communication between the servo valve 44 and opposite sides of actuator piston 26. As shown spool valve 46 is in a neutral position and all flow through the servo valve 44 is blocked. Movement of the spool valve 46 to the right provides communication between the high pressure servo fluid line 40 and conduit 54 thereby communicating the left side of piston 26 and the right side of piston 30 with high pressure servo fluid. At the same time communication is established between conduit 56 connected with the right side of piston 26 and the left side of piston 30 and a servo return line 58. The steered wheel 10 would then be caused to rotate to the right. Movement of the spool valve 46 to the left would result in communication between the high pressure servo fluid line 40 and conduit 56 thereby communicating high pressure fluid to the right side of piston 26 and the left side of piston 30 and also communicating conduit 54 with the servo return line 58. This would result in turning steered wheel 10 to the left. A pair of check valves 60 and 62 are provided in conduits 54 and 56 respectively.

A control valve 64 is shown connected to the servo input line 40 by means of a conduit 66 and to the servo return line 58 by means of a conduit 68. This valve is also connected to conduits 54 and 56 by conduits 70 and 72 respectively. A spool member 74 is axially movable within valve member 64 for controlling the communication between conduits 68, 70 and 72. In the position shown, spool valve member 74 permits communication between conduits 70 and 72, conduits 68 and 58 being blocked by spool valve 46. When the steering system is in operation, high pressure servo fluid is communicated with the chamber on the right end of valve member 74 thereby causing said member to be moved toward the left against the action of a spring 76 until it abuts against a stop 78. In this position fluid communication between conduits 70 and 72 is interrupted but there will be some flow to servo return through conduit 58. A longitudinal passageway 80 is provided in spool 74 which communicates with the chamber on the left end of said spool and also with an annular chamber near the right end of spool 74. This conduit and chamber are always in communication with return line 68. Because of the pressure level of fluid applied against the right end of spool valve 74, there will be a significant amount of leakage past the walls of said valve and this leakage fluid is collected in the annular chamber 82 and conducted to return line 68. If this high pressure leakage fluid were permitted to reach the conduits 70 or 72 it would exert an undesirable steering force against actuator pistons 26 and 30.

Operatively associated with check valve 60 and 62 in conduits 54 and 56, respectively, are a pair of small bleeds 84 and 86. These bleeds operate in conjunction with the control valve 64 to provide means for inhibiting or damping shimmy forces which might be transmitted to the actuator pistons 26 and 30 from the wheel 10. If, for some reason, the fluid pressure level in line 66 and hence, the general fluid pressure level of the servo system should drop below a certain minimum value, valve member 74 will be forced to the right under the action of spring 76 causing the valve member to assume a position substantially as shown in the drawing. This set of circumstances presupposes that normal power steering is inoperative. The steered wheel 10 is then controlled through its own inherent castering action. Any forces tending to deflect wheel 10 or to cause said wheel to shimmy will be transmitted through shafts 22 and 24 to actuating pistons 26 and 30 and, because of the fact that valve member 74 has assumed a position permitting communication between conduits 70 and 72 a restricted flow is permitted between opposite sides of the actuating pistons. As an example, assume a force attempting to deflect wheel 10 to the right. This will result in causing piston 26 to move to the right and piston 30 to move to the left. The effective result of this movement is that there will be a flow of fluid out of the chamber on the right side of piston 26 through bleed 86 into conduit 56, through conduit 72, across spool valve member 74 into conduit 70, through bleed 84 and into the chamber on the left side of piston 26. Any oscillatory movement of pistons 26 and 30 is, of course, considerably damped because of the relatively small size of the orifices 84 and 86.

Also connected in return line 58 is a compensator valve 88. This valve in combination with check valve 42 operates to maintain a certain fluid pressure level in the control system even though the high pressure servo fluid may no longer be available from the source. Compensator valve 88 also serves to relieve undesirably high pressures which might occur in the system because of temperature changes in the servo fluid.

Referring again to the servo valve structure 44, the position of spool valve 52 is controlled through electrical means effective to vary the fluid pressure operating against the ends of said spool valve. Servo pressure from conduit 40 is communicated around land 50 into a chamber 90 thence through a pair of restrictions to a pair of conduits 92 and 94. High pressure fluid flowing through conduits 92 and 94 enters a chamber 96 containing a flapper valve 98 forming part of a torque motor 99 and is returned to servo return conduit 58 by means of a conduit 100. Inasmuch as the fluid pressure circuits including conduits 92 and 94 are essentially symmetrical, a stream of high pressure fluid is directed against each side of flapper valve 98 and as long as it maintains a neutral position as shown there will be no unbalanced force acting against spool valve 52 and tending to cause it to move away from the neutral position as shown. Should flapper valve 98 be moved to a position closer to the outlet of either of conduits 92 or 94 an unbalanced force will be developed. Specifically, assume that flapper valve 98 is moved into close proximity with the end of conduit 94. This will result in a blocking of the flow out of conduit 94 and a consequent rise in the fluid pressure level in the chamber on the right hand end of spool valve 52. There would also be a corresponding reduction in the fluid pressure level acting on the left hand end of spool valve 52 and this valve will then tend to move toward the left. Should flapper valve 98 be moved downwardly in proximity with the end of conduit 92 the opposite effect will result. Control of flapper valve 98 is effected by means of a pair of windings 102 and 104 which receive signals from an electrical amplifier 106. When the signals supplied to windings 102 and 104 are equal in magnitude the flapper will be maintained in a neutral position as shown.

Amplifier 106 is connected in a differential arrangement whereby it is supplied with two signals which are compared and any difference in the voltage level of these signals appears as a difference in the voltage drop across windings 102 and 104. A demand or request signal is supplied to the amplifier branch which includes a transistor 108, by means of a mechanical linkage connected to control means available to the pilot or operator and which might be actuated by rudder pedals. This linkage 110 is connected to a potentiometer 112 which is connected between a power supply line 114 and ground or common. This potentiometer may be wound to produce any desired linear or non-linear characteristic. Typically it will be wound such that a given movement of the rudder pedals will produce a smaller turning angle of the wheel near the centered position than near the maximum turning angle. On the opposite side of amplifier 106 a signal is supplied to transistor 116 by means of a feedback potentiometer 118 also connected between power supply line 114 and ground, the slider of which is actuated by means of a direct mechanical connection between the actuator shaft 22 and said slider. The position assumed by the slider of potentiometer 118 is therefore directly representative of the instantaneous position of the steered wheel 10. The signal picked off the slider on potentiometer 118 is supplied to the transistor 116 and after being amplified in the transistor appears on winding 102 of the torque motor 99. In order to provide means for balancing the differential amplifier 106 a potentiometer 120 is connected between the emitters of the transistors 108 and 116. A resistor 122 is connected between potentiometer 120 and ground in order to determine the point at which the amplifier saturates; thus protecting the torque motor from damage due to excessive current.

A switch 124 shown in power supply line 114 is manually operated and controls the flow of current to the amplifier and to the potentiometers thereby initiating operation of the power steering system. Also connected in power supply line 114 is a swivel disconnect switch 126 which is mechanically coupled to the steered portion of the landing gear mechanism—in this case connected to shaft 12. The purpose of this switch is to automatically disconnect the power steering device whenever the wheel 10 is rotated beyond a certain limiting value. It occasionally becomes necessary, particularly aboard carriers, to rotate the nose wheel to a very high degree, in some cases so much that it is even necessary to partially disconnect the mechanical steering linkage system in order to maneuver the aircraft into the desired position. When this is done it is desirable that the power steering be disconnected because the wheel would tend to turn opposite to the direction which the operator anticipated if it initially started from a position in the neighborhood of a 180° rotated from its normal straight-ahead steered position. Under these conditions it is preferable that the wheel assume its normal straight-ahead position due to castering action. Also connected in series with switch 126 and the power source is a switch 127 which is actuated upon retraction of the steered wheel into the fuselage of the aircraft.

Referring again to request potentiometer 112 it will be noted that the slider of this potentiometer is connected to the amplifier through a switch 128 and a switch 130 before being connected to the base of transistor 108. The switch 128 is termed a strut extension switch and is connected to the strut in such manner that the switch will be caused to assume the position against the upper of the two contacts shown when the strut is extended as during flight when the load is removed therefrom. During this time it is desirable that the steered wheel 10 be maintained in a straight-ahead position and the slider on the request potentiometer 112 is removed from the circuit and instead a centering signal or centering position request signal is supplied to the amplifier 106 through lead 132 connected to a stationary tap at the center of potentiometer 112.

The switch 130 is mechanically linked with a switch 134 connected in parallel with manually operated switch 124. These switches are moved to the bottom pair of contacts when an arresting device of the type used for carrier landings is actuated. Under these conditions the manual switch 124 is shunted by switch 134 and the centering signal appearing on wire 132 is supplied to the base of transistor 108. In this way the power steering system assures that the steered wheel will maintain a straight-ahead position during carrier landings. The strut extension switch 128 assures that the steered wheel would remain in centered position during the approach. The switches 130 and 134 act to further maintain the centered position of the wheel during the landing and after a load is placed on the strut. It will thus be recognized that during a landing operation on a carrier the front wheel will be maintained in a straight-ahead position when the power steering system is operative or, should there be a failure of the electrical system or the high pressure servo fluid source the wheel will seek a straight-ahead position through its inherent castering action immediately upon making contact with the deck.

Operation of the system may perhaps be best understood by describing a number of operating conditions and the manner in which the control acts to meet these operating conditions. Normally, starting of the engine and increasing its speed to ground idle will cause a pump, not shown, to provide the high pressure servo fluid for the system. The power steering system is then placed into operation by the pilot or operator who depresses the switch 124 thereby energizing the amplifier 106 and also causing the solenoid 38 to seek a position whereby the high pressure servo fluid is permitted to flow to the servo valve 44. Steering is initiated by action of the rudder pedals which will move the slider on potentiometer 112 thereby providing to the amplifier 106 a steering request signal which is not balanced by the voltage signal picked off by the slider on potentiometer 118. This unbalance then appears as a voltage differential on the windings 102 and 104 and the flapper valve 98 is caused to move to a position off its center as shown. As a result the spool valve 46 seeks a position in which the high pressure servo fluid is permitted to flow to one side of piston 26 and the opposite side of piston 30 resulting in a movement of the wheel 10. Assume for the moment that the requested change results in a higher pressure of servo fluid against the right end of spool valve 46. Valve 46 will be moved to the left and high pressure servo fluid will be in communication with the right side of piston 26 through conduit 40, valve 44, conduit 56 and the check valve 62. It will also be in communication with the left side of piston 30 through conduit 34. This would result in turning of wheel 10 to the left. The resulting movement of piston 26 and its associated shaft 22 causes a movement of the slider on the potentiometer 118 to a new position in which the signal supplied thereby to the amplifier 106 effectively balances the signal supplied from potentiometer 112. The aircraft is then steered in this manner until take-off at which time the strut extension switch 128 would assume a position against the bottom one of its two contacts thereby providing a centering signal to the amplifier 106 and causing the power steering system to maintain the steered wheel in a straight-ahead position. Assuming the aircraft then makes a carrier landing, the wheel would still be held in a straight-ahead position by the power steering system through the action of the strut extension switch 128 until the touch-down on the deck, at which time this switch would then assume a position against the upper of its two contacts but the centering signal would still be effective because the switches 130 and 134 would act to hold the wheel in centered position during the actual landing on the deck.

Assume now for the moment that there is either a failure of the electrical system or of a high pressure servo fluid supply such that the spool valve 46 is maintained in the position as shown and there is no differential of servo fluid pressure available to supply to the actuating pistons. The reduction in the pressure of the servo fluid would cause the ball check valve 42 to be seated under the action of its spring and the pressure in the return line 58 would be insufficient to open valve 88. Therefore, a certain predetermined level of fluid pressure would be trapped in the system even in spite of the unavailability of a high pressure servo fluid. This would case the wheel to be steered through its normal castering action. The reduction in the pressure of the servo fluid causes the valve 64 to be moved toward the right thereby placing the conduits 70 and 72 in communication and permitting shimmy damping as previously described. It will thus be seen that we have provided a power steering system for aircraft which is very sensitive and responsive and in which the maximum degree of safety is provided in that a straight-ahead position is assured for the wheel during landing approaches and deck landings and also in which any failure of electrical or servo system such as might be sustained due to enemy action will result in the steered wheel returning to its inherent castering action.

Although only one embodiment is shown and described herein it is recognized that modifications may be made without departing from the spirit of the present invention.

We claim:

1. In a power steering device for aircraft including a steerable, casterable wheel, a shaft rotatable with said wheel, hydraulic motor means including a cylinder and a piston in said cylinder effective to divide said cylinder into two chambers, said piston being operably connected to said shaft for controlling rotation of said shaft, servo valve means controlling the flow of hydraulic fluid to one side or the other of said piston, pressure responsive valve means operable in association with said servo valve means for maintaining a minimum servo pressure level effective in said hydraulic motor means, second pressure responsive valve means for controlling fluid communication between said chambers for damping oscillatory movement of said piston, and pilot operated rudder control means: an actuator for said servo valve means comprising a torque motor having a pair of control windings, electrical means for controlling said torque motor including a pair of amplification devices connected to each of said control windings, a potentiometer connected to said rudder control means and to one of said amplification devices for supplying a steering request signal to said electrical means, and a second potentiometer operatively connected to said shaft and connected to the other of said amplification devices for providing a position feedback signal to said electrical means.

2. In a power steering device for aircraft including a steerable, casterable wheel, a shaft rotatable with said wheel, hydraulic motor means including a cylinder and a piston in said cylinder effective to divide said cylinder into two chambers, said piston being operably connected to said shaft for controlling rotation of said shaft, servo valve means controlling the flow of hydraulic fluid to one side or the other of said piston, pressure responsive valve means operable in association with said servo valve means for maintaining a minimum servo pressure level effective in said hydraulic motor means, second pressure responsive valve means for controlling fluid communication between said chambers for damping oscillatory movement of said piston, and pilot operated rudder control means: an actuator for servo valve means comprising electrical means for controlling the flow of hydraulic fluid to said servo valve, and amplification means for controlling said electrical means including first and second amplifying devices connected to said electrical means, a first variable resistance device connected to said first amplification device for supplying a steering request signal to said amplification means and a second variable resistance device operatively connected to said shaft and connected to said second amplification device for providing a follow-up signal for rebalancing said amplification means for each new position request value.

3. A power steering device as set forth in claim 2 wherein said first variable resistance device has a non-linear output characteristic whereby a given change in position request produces a smaller rotational movement of said shaft near the straight-ahead position of said wheel than under conditions where the turned angle of said wheel is large.

4. In a power steering device for aircraft including rudder control means, a steerable, casterable wheel, a shaft rotatable with said wheel, hydraulic motor means including a cylinder and a piston in said cylinder effective to divide said cylinder into two chambers, said piston being operably connected to said shaft for controlling rotation of said shaft, servo valve means controlling the flow of hydraulic fluid to one side or the other of said piston, pressure responsive valve means operable in association with said servo valve means for maintaining a minimum servo pressure level effective in said hydraulic motor means, second pressure responsive valve means for controlling fluid communication between said chambers for damping oscillatory movement of said piston, and pilot operated rudder control means: an actuator for said servo valve means comprising a torque motor having a pair of control windings, electrical means for controlling said torque motor including a differential amplifier having two channels each of which contains a transistor amplifier device operatively connected to one of said control windings, a potentiometer connected to one channel of said differential amplifier for supplying a steering request signal to said electrical means, and a second potentiometer operatively connected with said shaft and connected to the other channel of said differential amplifier for providing a follow-up signal for rebalancing said electrical means for each new position request value.

5. A power steering device as set forth in claim 4 wherein said first potentiometer has a non-linear output characteristic whereby a given change in position request produces a smaller rotational movement of said shaft near the straight-ahead position of said wheel than under conditions where the turned angle of said wheel is large.

6. In a power steering device including a steerable wheel, a shaft rotatable in accordance with said wheel, hydraulic motor means operably connected to said shaft for controlling rotation of said shaft, and servo valve means for controlling actuation of said motor means: an actuator for said servo valve means comprising a torque motor having a pair of control windings, electrical means for controlling said torque motor including a pair of amplification devices one of which is connected to each of said control windings, variable resistance means connected to one of said amplification devices for supplying a steering request signal to said electrical means, variable resistance means operably connected with said shaft and connected to the other of said amplification devices for providing a follow-up signal for rebalancing said electrical means for each new position request value, and means responsive to an operating condition of said steering device for automatically connecting a centering request signal to said one amplification device.

7. In a power steering device including a steerable wheel, a shaft rotatable in accordance with said wheel, hydraulic motor means operably connected to said shaft for controlling rotation of said shaft, shimmy damping means connected to said hydraulic motor means, and servo valve means for controlling actuation of said motor means: an actuator for said servo valve means comprising a torque motor having a pair of control windings, electrical means for controlling said torque motor including a differential amplifier having channels connected to each of said control windings, a potentiometer connected to one channel of said differential amplifier for supplying a steering request signal to said electrical means and including a stationary tap for producing a voltage output corresponding to a request for a centered position of said wheel, and a second potentiometer operatively connected with said shaft and connected to the other channel of said differential amplifier for providing a follow-up signal for rebalancing said electrical means for each new position request value, and means responsive to the removal of the load on said wheel for disconnecting the output of the slider of said first named potentiometer from said amplifier and connecting the output selected by said stationary tap to said amplifier.

8. In a power steering device including a steerable wheel, a shaft rotatable in accordance with said wheel, a hydraulic motor means operably connected to said shaft for controlling rotation of said shaft, shimmy damping means connected to said hydraulic motor means, and servo valve means for controlling actuation of said motor means: an actuator for said servo valve means comprising a torque motor having a pair of control windings, electrical means for controlling said torque motor including a differential amplifier having channels connected to each of said control windings, a potentiometer connected to one channel of said differential amplifier for supplying a steering request signal to said electrical means and including a stationary tap for producing a voltage output corresponding to a request for a centered position of said wheel, a second potentiometer operatively connected with said shaft and connected to the other channel of said differential amplifier for providing a follow-up signal for rebalancing said electrical means for each new position request value, and means for disconnecting the output of the slider of said potentiometer from said amplifier and connecting the output selected by said stationary tap to said amplifier.

References Cited in the file of this patent

UNITED STATES PATENTS

| | | |
|---|---|---|
| 2,398,421 | Frische et al. | Apr. 16, 1946 |
| 2,607,550 | Meredith | Aug. 19, 1952 |
| 2,621,002 | Pittman | Dec. 9, 1952 |
| 2,762,006 | Blanchard | Sept. 4, 1956 |
| 2,889,507 | Kennedy | June 2, 1959 |